2,829,925
FAN OR BLOWER, ESPECIALLY FOR USE IN PNEUMATIC CONVEYOR EQUIPMENT

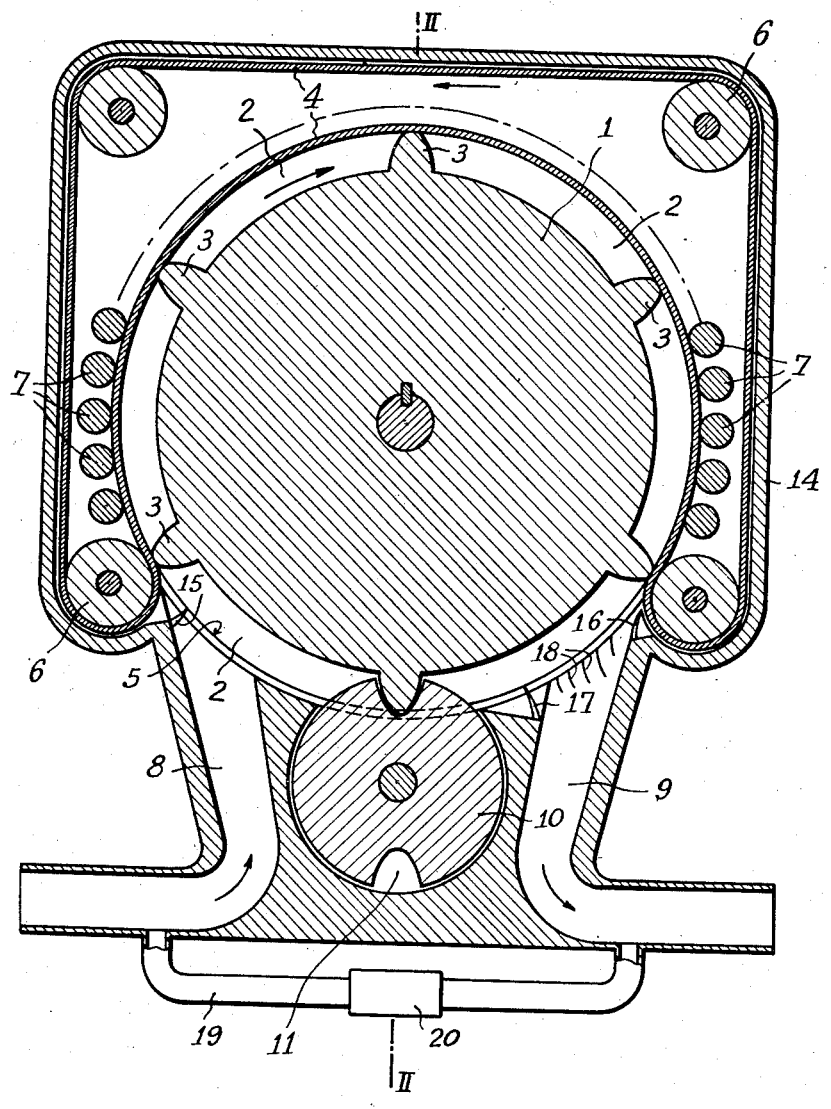

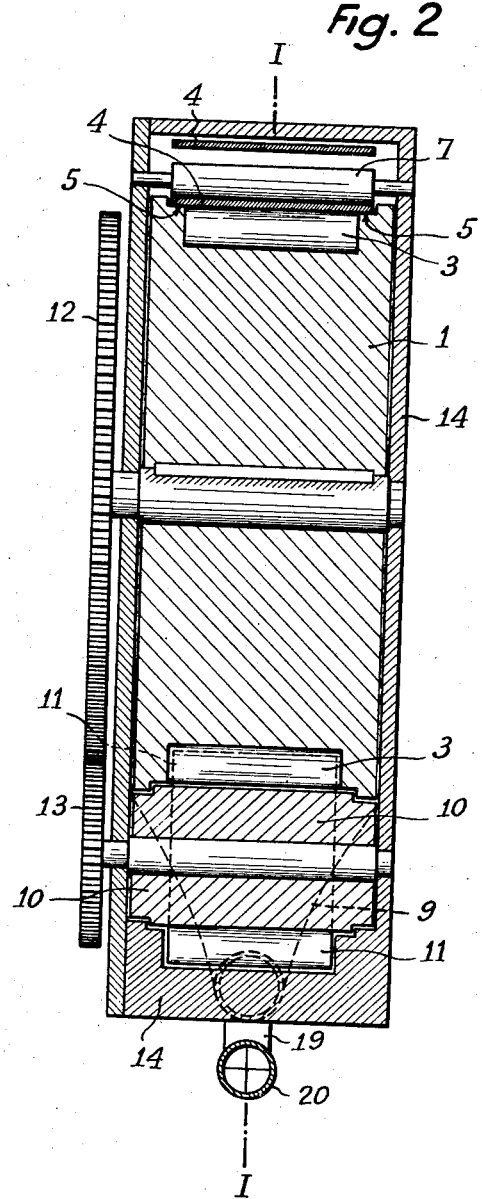

Jean Andre Monteil, Paris, France

Application April 17, 1956, Serial No. 578,818

7 Claims. (Cl. 302—37)

The present invention relates to a fan or blower, especially for use in pneumatic conveyor equipment.

In pneumatic conveyor equipment, the conveyed materials or articles cannot generally pass through the fans or blowers; if this, in fact, occurs, the materials run the risk of being crushed and the fan or blower of being damaged.

Consequently, it has hitherto been necessary to separate the conveyed materials from the conveying air at the entrance to the fan or blower, so that only the air traverses the latter, and then to reintroduce these same materials into the return or delivery conduit at the outlet from the fan or blower. This complicates the equipment and significantly increases its cost, as well as the conveying costs.

It is therefore an object of the present invention to provide a fan or blower which can be used in a general way as a vacuum pump or as a blower, but which finds a particularly useful application in pneumatic conveyor equipment in that it can be traversed without risk by the conveyed materials.

It is another object of the present invention to provide a fan or blower which comprises a rotor provided with peripherally spaced, radial vanes and embraced over part of its periphery by an endless belt, which is arranged in contact with the vanes and is adapted to be moved at a speed approximately equal to the peripheral speed of said vanes, inlet and delivery conduits arranged at the two extremities of the passage existing between the rotor and the endless belt, a rotary distributor provided with recesses adapted mutually to engage with said vanes and disposed between the delivery conduit and the inlet conduit in order to prevent air from passing directly between said two conduits and means for synchronously driving the rotor and the distributor.

It is yet another object of the present invention to provide a fan or blower wherein the rotor may conveniently comprise a double flanged wheel, the endless belt being arranged on a rolling track extending on both sides of the groove.

It is still another object of the present invention to provide a fan or blower wherein the ventilator is intended for use in a pneumatic conveyor, which includes a scraping means, with which the vanes come into contact before they contact with the endless belt. The presence of dust or of conveyed materials between the belt and the vanes, which would injure the degree of tightness of the belt, is thus avoided.

It is also a further object of the present invention to provide a fan or blower which includes a cleaning or scraping means with which the belt leaving the vanes comes in contact and which removes from said belt any conveyed materials or dust which may have adhered to it.

A further scraping member can also be provided with which the vanes come in contact before engaging in the recesses of the rotary distributor.

The inlet and delivery conduits, as is usual, may be connected by an auxiliary conduit in which is interposed a valve limiting the variation in pressure between said two conduits. Interruptions in the operation of the apparatus, as by breakdowns or blockages, which might be produced in case of accidental obstructions in one or other of the conduits, are thus avoided.

With these and other objects in view which will become apparent in the following detailed description, the present invention will be clearly understood in connection with the accompanying drawings, in which:

Figure 1 is a cross section along the lines 1—1 of Fig. 2 of a fan or blower constructed in accordance with the present invention; and Figure 2 is a section along the lines 2—2 of Fig. 1.

Referring now to the drawings, the fan or blower comprises a wheel 1 formed with a groove 2 and provided with vanes 3 which are distributed at regular intervals on the periphery of the wheel 1 and divide the groove 2 into equal sectors.

The wheel 1 is partly embraced by an endless belt 4 arranged on a rolling track 5 extending on both sides beyond the groove 2. The belt passes over pulleys, as at 6, some of which are preferably adjustable in position in order properly to tension the belt. Rollers such as 7 are arranged upon the outer surface of the belt and press it on to the rolling track 5.

The annular passage which exists between the bottom of the groove 2 and the belt 4 communicates with an inlet conduit 8 and a delivery conduit 9.

Between the conduits 8 and 9 is arranged a rotary distributor, comprising a wheel 10 provided with recesses 11, whose shape corresponds with that of the vanes 3, so that the latter are able to engage in the recesses. This wheel 10, which prevents the conduits 8 and 9 from communicating directly with one another, is inserted in the groove 2 almost as far as the bottom thereof, but with a very slight play.

The wheels 1 and 10 are connected with one another by gears 12 and 13, so as to turn in synchronism in order that the vanes 3 and the recesses 11 may mutually engage with one another.

A common drive (not shown) is provided to rotate the wheels 1 and 10 together with one of the pulleys 6, so that the belt 4 is moved at a speed approximately equal to the peripheral speed of the vanes 3.

The whole unit is arranged and supported in a housing 14, which encloses the wheel 10 in a cowling disposed around the periphery and over its sides. This cowling terminates, both over the sides and over the periphery of the wheel 10, at a very small distance from the rolling track 5. In addition, the housing 14 isolates the conduits 8 and 9 from the pulleys 6 in order to avoid the production of eddies which would interfere with the regular flowing out of the air and any articles to be transported.

The housing 14 carries a scraper 15 arranged in the suction conduit 8 and which scraper 15 engages the vanes 3 before the latter contact the belt 4. The housing 14 also carries a scraper 16 which is in contact with the operative surface of the belt 4, at the place where the latter leaves the path described by the vanes 3. Finally, a scraper 17, also carried by the housing 14, is disposed at a position immediately in front of the place where the vanes 3 engage in the recesses 11, the vanes 3 passing in contact with this scraper 17.

If desired, there may be provided at the delivery aperture (i. e. the entrance to the conduit 9), deflectors 18 fixed to the housing 14 and which on the one hand effect removal of conveyed articles and of dust from the place where a vane is about to engage in a recess and, on the other hand, serve to incorporate such articles and dust again in the air forced towards the delivery aperture.

The two conduits 9 and 8 are connected to one another by an auxiliary conduit 19, in which there is inserted a safety valve 20 for limiting the variation in pressure between the two conduits.

The fan or blower above-described operates in the following manner:

As the wheel 1 turns in the direction of the arrow, the air and any articles conveyed thereby are carried into the annular space formed by the walls of the groove 2 and the belt 4, due to the reduced pressure generated in this space by the displacement caused by the vanes 3.

The articles drawn in by suction are almost immediately urged against the belt 4 by centrifugal force. The scraper 15 prevents dust from being introduced between this belt and the vanes 3, thus allowing the greatest possible degree of tightness to be obtained.

The articles then leave the annular passage 2 tangentially to the circumference of the circular portion of of the belt rolling on the wheel 1, at the point where said belt leaves the rim of the wheel 1. The conveyed articles escape by way of the conduit 9.

The scraper 16 removes from the belt any dust on the articles which adheres to it, and the scraper 17 then cleans the vanes at the moment of their entry into the recesses 11.

It will be appreciated that the fan or blower which has been described in the foregoing can be traversed by a mixture of air and of granular or pulverulent materials without any damage resulting therefrom, either to the fan or blower itself or to the materials transported.

While I have disclosed one embodiment of the present invention, it is to be understood that this embodiment is given by example only and not in a limiting sense, the scope of the present invention being determined by the objects and the claims.

I claim:

1. A fan or blower, particularly for use in pneumatic conveyor equipment, comprising a rotor rotatably mounted in a housing and having a plurality of peripherally spaced, radial vanes and an endless belt embracing a part of the periphery of said rotor, said belt being in sealing contact with the outer faces of said vanes and defining together with the latter and the peripheral face of said rotor a working chamber, said belt moving at a speed substantially identical with the peripheral speed of said vanes, a rotary distributor having a plurality of recesses complementary to said vanes of the rotor, means for synchronous driving of said rotor and said distributor in order to provide sealing contact between the said respective vanes of said rotor and corresponding recesses in said distributor, said chamber defined by said vanes, the periphery of said rotor and said belt forming a passage for the materials to be conveyed, inlet and delivery conduits leading to and emerging from the respective terminals of said passage, and said distributor sealingly separating said inlet conduit and said delivery conduit in order to prevent direct communication between said conduits.

2. The fan or blower, as set forth in claim 1, wherein said rotor comprises a double-flanged wheel having a shoulder adjacent each of said flanges, said shoulder being disposed intermediate said flanges and forming a track for said belt.

3. The fan or blower, as set forth in claim 1, which includes scraper means disposed adjacent said inlet conduit and engaging each of said vanes while passing along said scraper means prior to contact of said vanes with said belt.

4. The fan or blower, as set forth in claim 1, which includes scraper means disposed adjacent said delivery conduit and engaging said belt upon disengagement with each of said vanes at the end of said passage.

5. The fan or blower, as set forth in claim 1, which includes scraper means disposed adjacent said delivery conduit and engaging successively each of said vanes prior to their contact with said recesses of said distributor.

6. The fan or blower, as set forth in claim 1, which includes an auxiliary conduit connecting shortly said inlet conduit with said delivery conduit, and a valve disposed in said auxiliary conduit intermediate its ends, in order to control the pressure variation between said inlet conduit and said delivery conduit.

7. The fan or blower, as set forth in claim 1, which includes a plurality of deflector means disposed at the entrance of said delivery conduit and secured to said housing and adapted to remove said conveyed articles from a place where a vane is about to engage in a recess.

References Cited in the file of this patent

UNITED STATES PATENTS

| | | |
|---|---|---|
| 666,588 | Aitken | Jan. 22, 1901 |
| 2,745,355 | Mosbacher | May 15, 1956 |